United States Patent
Dong et al.

(10) Patent No.: US 10,015,859 B2
(45) Date of Patent: Jul. 3, 2018

(54) BACKLIGHT SOURCE ADJUSTMENT METHOD, BACKLIGHT SOURCE ADJUSTMENT DEVICE, AND DISPLAY DEVICE

(71) Applicants: BOE TECHNOLOGY GROUP CO., LTD., Beijing (CN); BOE (HEBEI) MOBILE DISPLAY TECHNOLOGY CO., LTD., Hebei (CN)

(72) Inventors: Ruijun Dong, Beijing (CN); Dong Chen, Beijing (CN); Guangquan Wang, Beijing (CN); Haiwei Sun, Beijing (CN); Lili Chen, Beijing (CN); Wei Sun, Beijing (CN); Chenru Wang, Beijing (CN); Junjie Miao, Beijing (CN); Junjie Ma, Beijing (CN)

(73) Assignees: BOE TECHNOLOGY GROUP CO., LTD., Beijing (CN); BOE (HEBEI) MOBILE DISPLAY TECHNOLOGY CO., LTD., Hebei (CN)

( * ) Notice: Subject to any disclaimer, the term of this patent is extended or adjusted under 35 U.S.C. 154(b) by 0 days.

(21) Appl. No.: 15/263,439

(22) Filed: Sep. 13, 2016

(65) Prior Publication Data
US 2017/0202070 A1    Jul. 13, 2017

(30) Foreign Application Priority Data
Jan. 11, 2016 (CN) .......................... 2016 1 0016288

(51) Int. Cl.
*H05B 33/08* (2006.01)
*G02F 1/13357* (2006.01)
(Continued)

(52) U.S. Cl.
CPC ....... *H05B 33/0854* (2013.01); *G02F 1/1336* (2013.01); *G09G 3/3406* (2013.01); *H05B 33/0872* (2013.01); *H05B 37/0218* (2013.01)

(58) Field of Classification Search
CPC ... G02F 1/133611; G02F 2001/133618; H05B 33/0872; H05B 37/0218; H05B 39/041; H05B 41/38
(Continued)

(56) References Cited

U.S. PATENT DOCUMENTS

| 2010/0156959 A1 | 6/2010 | Tanahashi |
| 2012/0188483 A1 | 7/2012 | Matsuzaki et al. |

(Continued)

FOREIGN PATENT DOCUMENTS

| CN | 101055709 A | 10/2007 |
| CN | 101761827 A | 6/2010 |

(Continued)

OTHER PUBLICATIONS

First Office Action for Chinese Application No. 201610016288.0, dated Oct. 10, 2017, 10 pages.

*Primary Examiner* — Douglas W Owens
*Assistant Examiner* — Henry Luong
(74) *Attorney, Agent, or Firm* — Brooks Kushman P.C.

(57) ABSTRACT

The present disclosure provides a backlight source adjustment method, a backlight source adjustment device and a display device. After acquiring intensity information and spectrum information of current ambient light, a color temperature corresponding to the current ambient light is determined in accordance with the spectrum information of the current ambient light, and a total current to be currently supplied to a backlight source is determined in accordance with the intensity information of the current ambient light. Brightness values of light source branches having different (Continued)

color ranges in the backlight source are determined in accordance with the determined color temperature corresponding to the current ambient light and the total current, and currents for the light source branches are adjusted, so as to adjust color gamut of the backlight source in accordance with the current ambient light.

20 Claims, 4 Drawing Sheets

(51) Int. Cl.
*H05B 37/02* (2006.01)
*G09G 3/34* (2006.01)

(58) Field of Classification Search
USPC ......... 315/151, 158, 291, 307–308; 362/552, 362/561, 97.1
See application file for complete search history.

(56) References Cited

U.S. PATENT DOCUMENTS

| 2014/0049527 A1* | 2/2014 | Lanzoni | G09G 3/36 345/207 |
| 2014/0285477 A1* | 9/2014 | Cho | G09G 3/2003 345/207 |
| 2015/0301407 A1* | 10/2015 | Chan | G02F 1/133603 349/64 |
| 2016/0249030 A1 | 8/2016 | Masuyama | |

FOREIGN PATENT DOCUMENTS

| CN | 102621738 A | 8/2012 |
| CN | 103957345 A | 7/2014 |

\* cited by examiner

BACKLIGHT SOURCE ADJUSTMENT METHOD, BACKLIGHT SOURCE ADJUSTMENT DEVICE, AND DISPLAY DEVICE

CROSS-REFERENCE TO RELATED APPLICATIONS

This application claims priority to Chinese application No. 201610016288.0, filed Jan. 11, 2016, which is hereby incorporated by reference in its entirety.

TECHNICAL FIELD

The present disclosure relates to the field of display technology, in particular to a backlight source adjustment method, a backlight source adjustment device, and a display device.

BACKGROUND

Currently, mobile electronic products have become an essential part of people's lives, and the display quality of these mobile electronic products is increasingly demanded. Due to an oversize chromatic aberration, i.e., a difference between visual color temperatures occurring when white images are displayed by the electronic products in an identical batch, the requirements on chromaticity uniformity are increasingly demanded by manufacturers. Usually, in the case of manufacturing a backlight source, i.e., a light-emitting diode (LED) lamp, for a liquid crystal display device, color gamut of an LED is relatively large. In the case that merely the LEDs with one color temperature range are used for manufacturing the backlight source and the other LEDs with the other color temperature ranges are discarded, it is able to meet the requirements on the color gamut, but the production cost will increase significantly and the yield thereof will decrease. Hence, the LED lamps with two or more color temperature ranges may be arranged in a certain manner so as to form a light strip of an identical backlight source. Based on a principle of color mixing, the chromaticity and brightness may be converted into X, Y and Z values, i.e., tristimulus values, and these values may then be added linearly and converted into the final chromaticity and brightness, so as to narrow the color temperature range of the mixed LED lamps, thereby to meet the requirements on the chromaticity uniformity. In addition, it is able to improve the utilization of the LEDs, thereby to significantly reduce the production cost of the LED lamp.

The color gamut of the liquid crystal display device is adjusted substantially by adjusting the chromaticity of a color filter. However, the light transmittance of the liquid crystal display device may be adversely affected by such an adjustment method. In addition, the adjustment may take a relatively long time period, so the production efficiency may be adversely affected.

Hence, there is an urgent need in the art to adjust the color gamut of the liquid crystal display device using the backlight source having the LED lamps with several color temperature ranges.

SUMMARY

An object of the present disclosure is to provide a backlight source adjustment method, a backlight source adjustment device and a display device, so as to adjust color gamut of the display device by adjusting color gamut of a backlight source.

In one aspect, the present disclosure provides in some embodiments a backlight source adjustment method, including steps of: acquiring intensity information and spectrum information of current ambient light; determining a color temperature corresponding to the current ambient light in accordance with the acquired spectrum information of the current ambient light; determining a total current to be currently supplied to a backlight source in accordance with the acquired intensity information of the current ambient light; and determining brightness values of light source branches having different color ranges in the backlight source in accordance with the determined color temperature corresponding to the current ambient light and the total current, and adjusting currents for the light source branches.

Alternatively, the step of determining the color temperature corresponding to the current ambient light in accordance with the acquired spectrum information of the current ambient light includes: comparing the acquired spectrum information of the current ambient light with predetermined spectrum information of various types of light sources, so as to determine a type of a light source in a current environment; and determining a predetermined color temperature corresponding to the type of the light source as the color temperature corresponding to the current ambient light in accordance with the determined type of the light source in the current environment.

Alternatively, the step of comparing the acquired spectrum information of the current ambient light with the predetermined spectrum information of various types of light sources so as to determine the type of the light source in the current environment includes: comparing the spectrum information of the current ambient light with a predetermined spectrum of natural light, so as to determine the current environment; in the case that the current environment is an outdoor environment, determining the natural light as the type of the light source in the current environment; and in the case that the current environment is an indoor environment, comparing the spectrum information of the current ambient light with predetermined spectrum information of various illumination sources, and determining an illumination source with the spectrum information closest to the spectrum information of the current ambient light as the type of the light source in the current environment.

Alternatively, the predetermined spectrum of the natural light includes spectra of the natural light within different time periods, and the step of comparing the spectrum information of the current ambient light with the predetermined spectrum of the natural light so as to determine the current environment includes: determining a time period to which a current moment displayed by a system clock belongs in accordance with predetermined time periods; determining a spectrum of the natural light corresponding to the time period to which the current moment belongs; and comparing the spectrum information of the current ambient light with the spectrum of the natural light corresponding to the time period to which the current moment belongs, so as to determine the current environment.

Alternatively, the step of determining the predetermined color temperature corresponding to the type of the light source as the color temperature corresponding to the current ambient light in accordance with the determined type of the light source in the current environment includes, in the case that the determined type of the light source in the current environment is the natural light, determining a predetermined color temperature corresponding to the natural light within the time period to which the current moment belongs as the color temperature corresponding to the current ambient light.

Alternatively, the predetermined time periods include early morning, midday, dusk and night.

Alternatively, the light source branches in the backlight source include a blue-light-preventing light source branch.

Alternatively, subsequent to the step of determining the color temperature corresponding to the current ambient light in accordance with the acquired spectrum information of the current ambient light, the backlight source adjustment method further includes: determining a blue light content to be received by human eyes in the current ambient light in accordance with the acquired intensity information of the current ambient light, the determined color temperature corresponding to the current ambient light and a display duration; and determining an upper limit of a currently allowable blue light content from the light source branches in accordance with the determined blue light content to be received by the human eyes in the current ambient light and a predetermined blue light content threshold capable of being received by the human eyes.

The step of determining the brightness values of the light source branches having different color ranges in the backlight source in accordance with the determined color temperature corresponding to the current ambient light and the total current and adjusting the currents for the light source branches includes: determining the brightness values of the light source branches in the backlight source in accordance with the upper limit of the currently allowable blue light content from the light source branches and the color temperature corresponding to the current ambient light; and adjusting the currents for the light source branches in accordance with the determined total current.

Alternatively, the step of determining the total current to be currently supplied to the backlight source in accordance with the acquired intensity information of the current ambient light includes: determining a current distance between the human eye and a screen in front of the backlight source; and determining the total current to be currently applied to the backlight source in accordance with the current distance between the human eye and the screen in front of the backlight source and the intensity information of the current ambient light.

Alternatively, when an intensity value of the current ambient light is constant, the smaller the current distance between the human eye and the screen in front of the backlight source, the smaller the total current to be currently applied to the backlight source; and when the current distance between the human eye and the screen in front of the backlight source is constant, the larger the intensity value of the current ambient light, the larger the total current to be currently applied to the backlight source.

In another aspect, the present disclosure provides in some embodiments a backlight source adjustment device, including: a sensing module configured to acquire intensity information and spectrum information of current ambient light; a processing module configured to determine a color temperature corresponding to the current ambient light in accordance with the acquired spectrum information of the current ambient light; a power supply module configured to determine a total current to be currently supplied to a backlight source in accordance with the acquired intensity information of the current ambient light; and an adjustment module configured to determine brightness values of light source branches having different color ranges in the backlight source in accordance with the determined color temperature corresponding to the current ambient light and the total current, and adjust currents for the light source branches.

Alternatively, the backlight source adjustment device further includes a storage module configured to store therein spectrum information of various types of light sources and color temperatures corresponding to the various types of light sources. The processing module is further configured to compare the acquired spectrum information of the current ambient light with the predetermined spectrum information of the various types of light sources, so as to determine a type of a light source in a current environment; and determine the predetermined color temperature corresponding to the type of the light source as the color temperature corresponding to the current ambient light in accordance with the determined type of the light source in the current environment.

Alternatively, the processing module is further configured to: compare the spectrum information of the current ambient light with a predetermined spectrum of natural light, so as to determine the current environment; in the case that the current environment is an outdoor environment, determine the natural light as the type of the light source in the current environment; and in the case that the current environment is an indoor environment, compare the spectrum information of the current ambient light with predetermined spectrum information of various illumination sources, and determine an illumination source with the spectrum information closest to the spectrum information of the current ambient light as the type of the light source in the current environment.

Alternatively, the storage module is further configured to store therein spectra of the natural light within different time periods. The processing module is further configured to: determine a time period to which a current moment displayed by a system clock belongs in accordance with predetermined time periods; determine a spectrum of the natural light corresponding to the time period to which the current moment belongs; and compare the spectrum information of the current ambient light with the spectrum of the natural light corresponding to the time period to which the current moment belongs, so as to determine the current environment.

Alternatively, the storage module is further configured to store therein color temperatures corresponding to the spectra of the natural light within the time periods. The processing module is further configured to, in the case that the determined type of the light source in the current environment is the natural light, determine a predetermined color temperature corresponding to the natural light within the time period to which the current moment belongs as the color temperature corresponding to the current ambient light.

Alternatively, the storage module is further configured to store therein the spectra and color temperatures of the natural light in the early morning, midday, dusk and night.

Alternatively, the light source branches in the backlight source include a blue-light-preventing light source branch. The processing module is further configured to: determine a blue light content to be received by human eyes in the current ambient light in accordance with the acquired intensity information of the current ambient light, the determined color temperature corresponding to the current ambient light and a display duration; and determine an upper limit of a currently allowable blue light content from the light source branches in accordance with the determined blue light content to be received by the human eyes in the current ambient light and a predetermined blue light content threshold capable of being received by the human eyes. The adjustment module is further configured to: determine the brightness values of the light source branches in the backlight source in accordance with the upper limit of the currently allowable blue light content from the light source branches and the color temperature corresponding to the current ambient light; and adjust the currents for the light source branches in accordance with the determined total current.

Alternatively, the sensing module is further configured to determine a current distance between the human eye and a screen in front of the backlight source, and the power supply module is further configured to determine the total current to be currently applied to the backlight source in accordance with the current distance between the human eye and the screen in front of the backlight source and the intensity information of the current ambient light.

Alternatively, when an intensity value of the current ambient light is constant, the smaller the current distance between the human eye and the screen in front of the backlight source, the smaller the total current to be currently applied to the backlight source; and when the current distance between the human eye and the screen in front of the backlight source is constant, the larger the intensity value of the current ambient light, the larger the total current to be currently applied to the backlight source.

In yet another aspect, the present disclosure provides in some embodiments a display device including a liquid crystal display panel, a backlight source below the liquid crystal display panel and having light source branches with different color ranges, and the above-mentioned backlight source adjustment device.

According to the backlight source adjustment method, the backlight source adjustment device and the display device in the embodiments of the present disclosure, after acquiring the intensity information and the spectrum information of the current ambient light, the color temperature corresponding to the current ambient light may be determined in accordance with the spectrum information of the current ambient light, and the total current to be currently applied to the backlight source may be determined in accordance with the intensity information of the current ambient light. Then, the brightness values of light source branches having different color ranges in the backlight source may be determined in accordance with the determined color temperature corresponding to the current ambient light and the total current, and then the currents for the light source branches may be adjusted, so as to adjust the color gamut of the backlight source in accordance with the current ambient light, thereby to adjust the color gamut of the liquid crystal display device and improve the user experience. As compared with the related art where the color gamut of the liquid crystal display device is adjusted by adjusting chromaticity of a color filter, it is able to flexibly adjust the color gamut of the liquid crystal display device and ensure the light transmittance thereof while reducing the production cost of the backlight source.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The present disclosure will be described hereinafter in conjunction with the drawings and embodiments.

Figure 1:
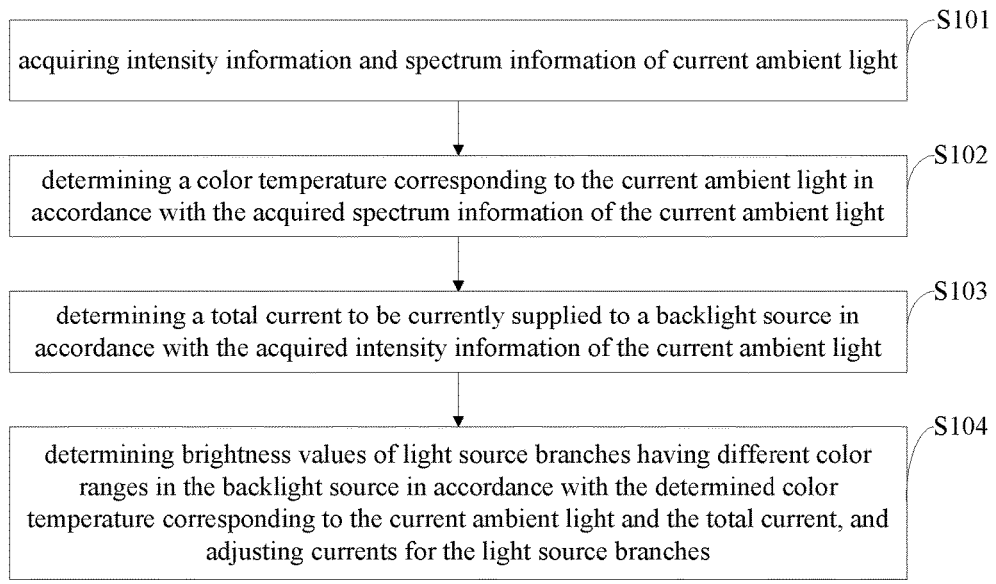
FIG. 1 is a flow chart of a backlight source adjustment method according to one embodiment of the present disclosure.

The present disclosure provides in some embodiments a backlight source adjustment method which, as shown in FIG. 1, includes following steps S101-S104.

Step S101 is to acquire intensity information and spectrum information of current ambient light.

Step S102 is to determine a color temperature corresponding to the current ambient light in accordance with the acquired spectrum information of the current ambient light.

Step S103 is to determine a total current to be currently supplied to a backlight source in accordance with the acquired intensity information of the current ambient light.

Step S104 is to determine brightness values of light source branches having different color ranges in the backlight source in accordance with the determined color temperature corresponding to the current ambient light and the total current, and adjust currents for the light source branches.

According to the backlight source adjustment method in the embodiments of the present disclosure, the currents for the light source branches in the backlight source may be adjusted in accordance with the current ambient light, so as to adjust a color gamut of a liquid crystal display device in accordance with the current ambient light, thereby to improve the user experience. As compared with the related art where the color gamut of the liquid crystal display device is adjusted by adjusting chromaticity of a color filter, it is able to flexibly adjust the color gamut of the liquid crystal display device and ensure the light transmittance thereof while reducing the production cost of the backlight source.

To be specific, in Step S101, the intensity information may be acquired by an optical sensor, and the spectrum information may be acquired by a spectral sensor. Further, in Step S101, the intensity information and the spectrum information of the current ambient light may be acquired in real time, but at this time, the amount of the acquired information is relatively large. Hence, the related information may be acquired at a certain interval, e.g., every one minute or ten minutes.

It should be appreciated that, Step S102 may be performed after the Step S103, or they may be performed simultaneously.

During the implementation, in Step S102, the color temperature corresponding to the current ambient light may be calculated in real time in accordance with the acquired spectrum information. In this way, it is able to acquire the color temperature in a more accurate manner, but the calculation burden is relatively heavy, and it is difficult to adjust the color temperature for the backlight source in real time in accordance with the current ambient light. In addition, an error may occur when reproducing the color temperature through the light source branches in the backlight source, i.e., the backlight source may emit the light with a color temperature approximate to, but not completely identical to, the color temperature corresponding to the current ambient light.

Figure 2:
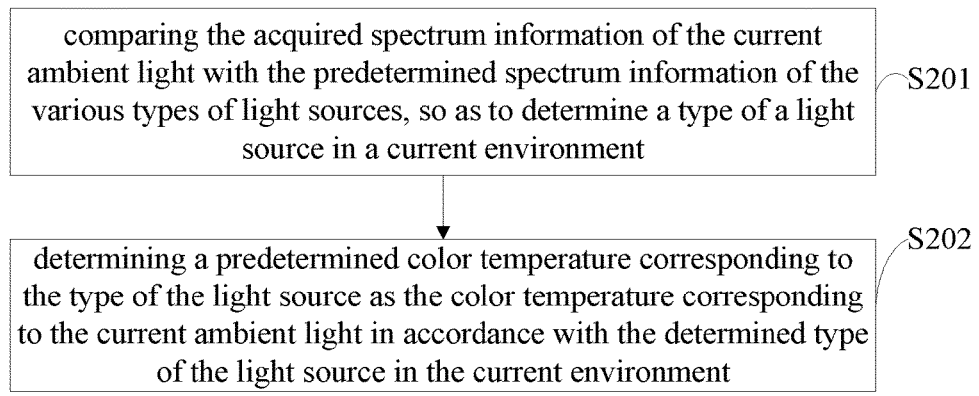
FIG. 2 is a flow chart of a step of determining a color temperature corresponding to current ambient light in the backlight source adjustment method according to one embodiment of the present disclosure.

Hence, during the implementation, the color temperature corresponding to the current ambient light may be determined in Step S102 in accordance with pre-stored spectrum information of various types of light sources and color temperatures corresponding thereto. To be specific, as shown in FIG. 2, Step S102 may include following steps S201-S202.

Step S201 is to compare the acquired spectrum information of the current ambient light with the predetermined spectrum information of the various types of light sources, so as to determine a type of a light source in a current environment.

Step S202 is to determine a predetermined color temperature corresponding to the type of the light source as the color temperature corresponding to the current ambient light in accordance with the determined type of the light source in the current environment.

Through determining the color temperature corresponding to the current ambient light in the above-mentioned way, it is able to reduce the calculation burden, thereby facilitating adjustment of the color temperature for the backlight source in real time in accordance with the current ambient light.

Figure 3:
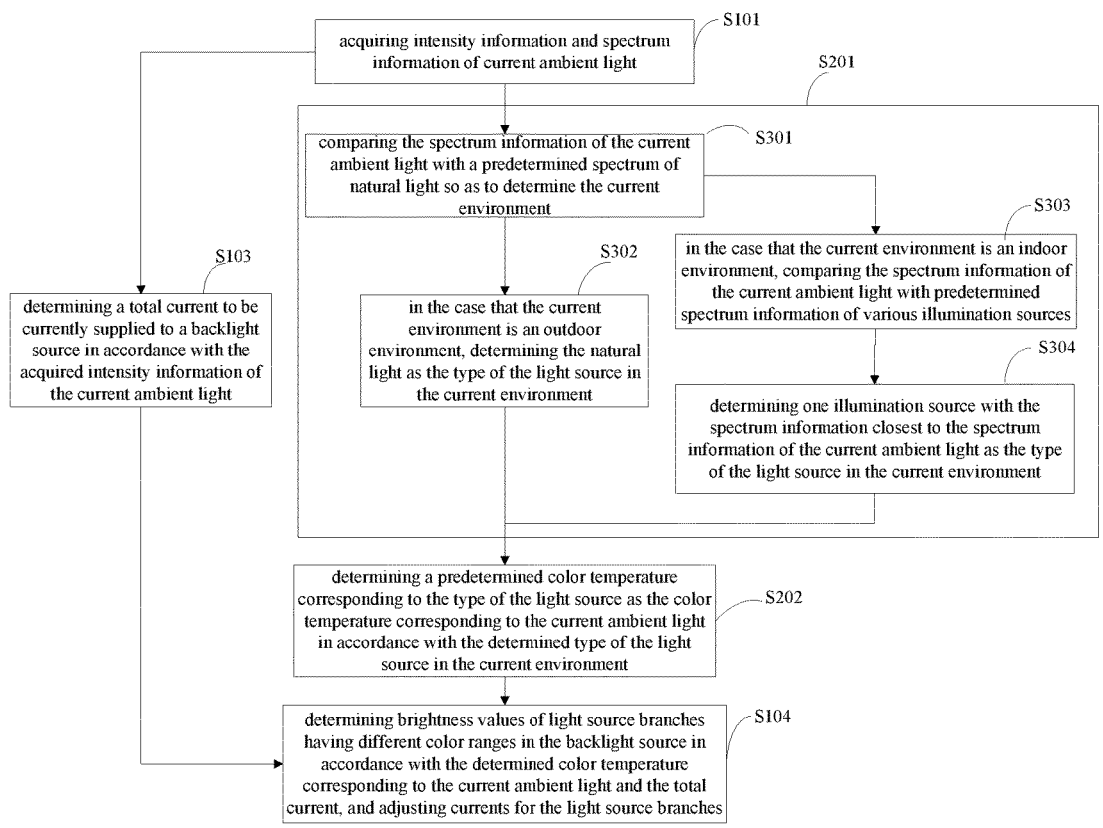
FIG. 3 is another flow chart of the backlight source adjustment method according to one embodiment of the present disclosure.

As shown in FIG. 3, Step S201 may further include following steps S301-S304.

Step S301 is to compare the spectrum information of the current ambient light with a predetermined spectrum of natural light so as to determine the current environment. In the case that the current environment is determined to be an outdoor environment, Step S302 is performed. In the case that the current environment is determined to be an indoor environment, Step S303 is performed.

Step S302 is to determine the natural light as the type of the light source in the current environment.

Step S303 is to compare the spectrum information of the current ambient light with predetermined spectrum information of various illumination sources.

Step S304 is to determine one illumination source with the spectrum information closest to the spectrum information of the current ambient light as the type of the light source in the current environment.

During the implementation, usually spectra of the natural light are slightly different from each other at different moments, so the spectra of the natural light within different time periods may be pre-stored, and at this time, Step S301 may be implemented as follows.

At first, a time period to which a current moment displayed by a system clock belongs may be determined in accordance with predetermined time periods. To be specific, the predetermined time periods may include early morning, midday, dusk and night.

Then, a spectrum of the natural light corresponding to the time period to which the current moment belongs may be determined. For example, in the case that a current moment displayed by the system clock is 12 a.m., the time period to which the current moment belongs may be determined as "midday", and the spectrum of the natural light corresponding to midday may be acquired from the pre-stored spectrum information.

Finally, the spectrum information of the current ambient light may be compared with the spectrum of the natural light corresponding to the time period to which the current moment belongs, so as to determine the current environment. For example, the pre-stored spectrum of the natural light corresponding to midday may be compared with the spectrum information of the current ambient light, and in the case that they are approximately identical to each other, the current environment may be determined as an outdoor environment.

During the implementation, usually the color temperatures corresponding to the natural light may be slightly different from each other at different moments. Hence, in some embodiments of the present disclosure, the color temperatures corresponding to the natural light within different time periods may be pre-stored. At this time, in Step S202, in the case that the determined type of the light source in the current environment is the natural light, a predetermined color temperature corresponding to the natural light within the time period to which the current moment belongs may be determined as the color temperature corresponding to the current ambient light.

To be specific, in Step S103, the total current may be adjusted as follows. The total current to be currently supplied to the backlight source may increase in the case that the current ambient light is of a large intensity value, so as to increase the total brightness of the backlight source, thereby to improve the user experience and protect user's eyes.

Usually, the backlight source having LED lamps with two or more color temperature ranges may include at least two light source branches having different color ranges, e.g., a high-color-gamut branch and a high-brightness branch. The LED lamps of each light source branch may usually be arranged evenly on a light strip. During the Implementation, in Step S104, in the case that the color temperature corresponding to the current ambient light is relatively large, the current for the high-color-gamut branch may increase, so as to enable the color temperature for the backlight source to be close to the color temperature corresponding to the current ambient light as possible after the light mixing.

Usually, an LED lamp may emit white light by exciting yellow phosphor with a short wave at a peak wavelength of 450 nm. Due to the use of high-energy blue light as exciting light, the luminous efficiency is relatively high. Although a high brightness value may be provided, it is impossible to prevent the human eyes from being damaged due to the high-energy blue light. Researches show that, retina may be damaged by the excessive high-energy blue light, especially macular degeneration may occur. Currently, very few backlight modules having an eye-protection function are available in the market, and generally, a film capable of filtering the blue light is attached onto the backlight module. However, these backlight modules are seriously yellowish, and their brightness is insufficient to meet the requirements on comfort level. In addition, an LED lamp with low-energy blue light as the exciting light may also be used, but the excitation level thereof is limited and the brightness is very low.

In order to switch the backlight source to an eye-protection mode in accordance with the practical need, the light source branches in the backlight source may further include a blue-light-preventing light source branch, i.e., one light source branch may be formed by the LED lamps with low-energy blue light as the exciting light.

Figure 4:
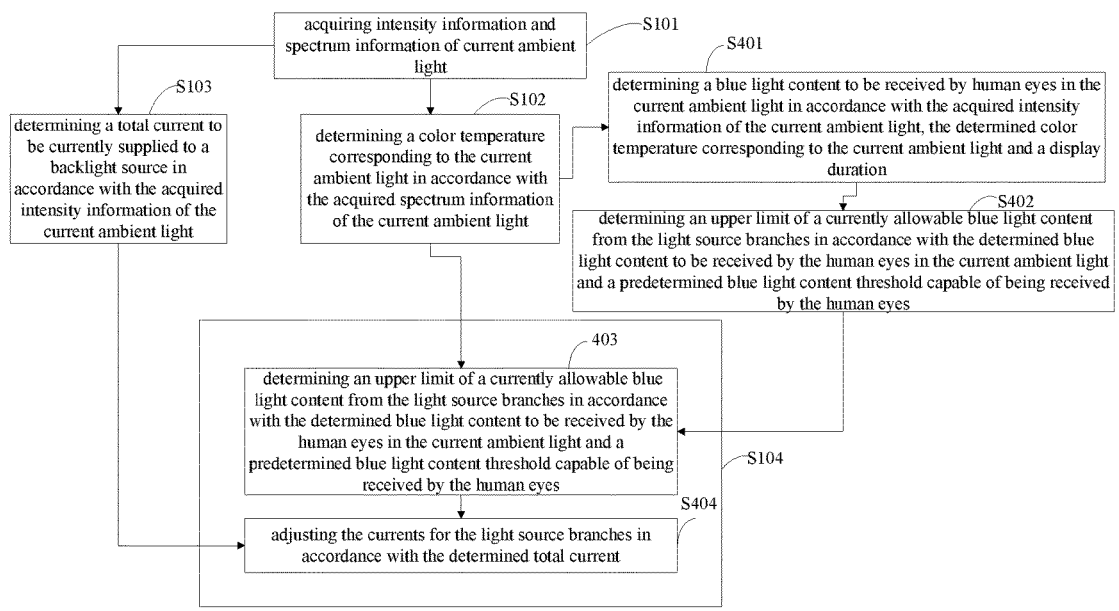
FIG. 4 is yet another flow chart of the backlight source adjustment method according to one embodiment of the present disclosure.

To be specific, in the case that the backlight source includes the blue-light-preventing light source branch, as shown in FIG. 4, subsequent to Step S102 and prior to Step S104, the method may further include the following steps S401-S402.

Step S401 is to determine a blue light content to be received by human eyes in the current ambient light in accordance with the acquired intensity information of the current ambient light, the determined color temperature corresponding to the current ambient light and a display duration. To be specific, the larger the intensity value of the current ambient light and the longer the display duration, the larger the blue light content to be received by the human eyes. In one embodiment, the blue light content to be received by the human eyes may be calculated over a one-minute circle.

Step S402 is to determine an upper limit of a currently allowable blue light content from the light source branches in accordance with the determined blue light content to be received by the human eyes in the current ambient light and a predetermined blue light content threshold capable of being received by the human eyes.

Accordingly, as shown in FIG. 4, Step S104 may include the following steps S403-S404.

Step S403 is to determine the brightness values of the light source branches in the backlight source in accordance with the upper limit of the currently allowable blue light content from the light source branches and the color temperature corresponding to the current ambient light. To be specific, the determined brightness values of the light source branches is less than the determined upper limit of the currently allowable blue light content from the light source branches, so as to prevent the human eyes from being damaged due to the blue light content.

Figure 6:
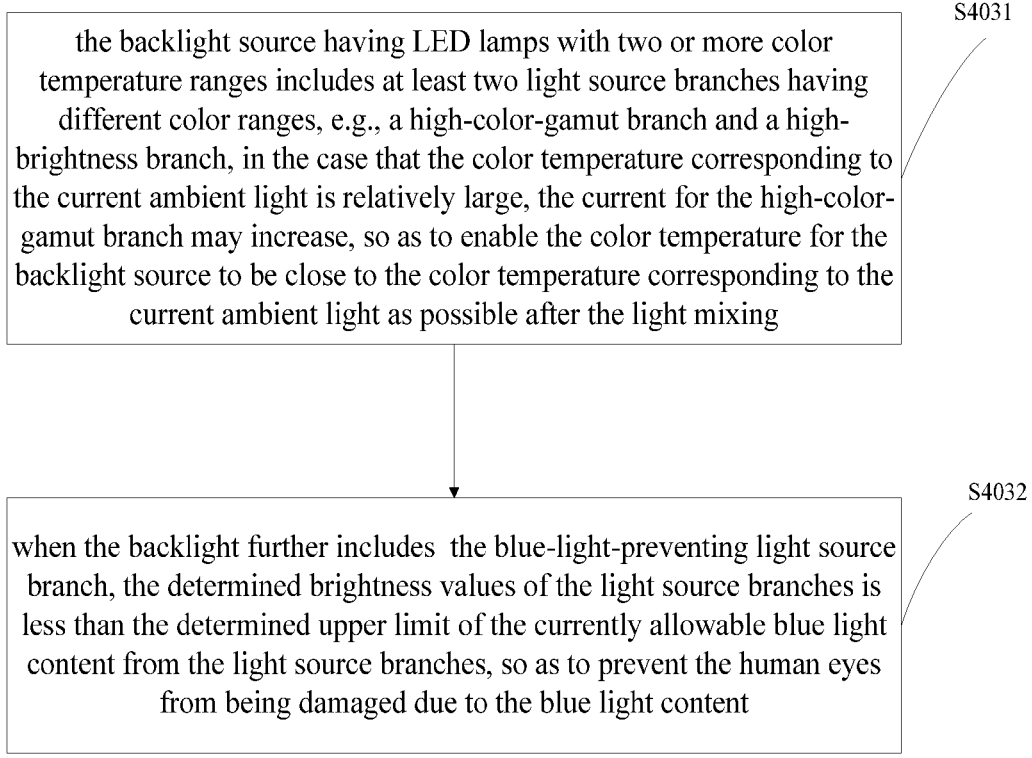
FIG. 6 is a flow chart according to an embodiment for steps of determining an upper limit of a currently allowable blue light content from the light source branches.

FIG. 6 shows an embodiment of the steps for determining an upper limit of a currently allowable blue light content from the light source branches in accordance with the determined blue light content to be received by the human eyes in the current ambient light and a predetermined blue light content threshold capable of being received by the human eyes. Specifically, in S4031, the backlight source having LED lamps with two or more color temperature ranges includes at least two light source branches having different color ranges, e.g., a high-color-gamut branch and a high-brightness branch, in the case that the color temperature corresponding to the current ambient light is relatively large, the current for the high-color-gamut branch may increase, so as to enable the color temperature for the backlight source to be close to the color temperature corresponding to the current ambient light as possible after the light mixing; and in S4032, when the backlight further includes the blue-light-preventing light source branch, the determined brightness values of the light source branches is less than the determined upper limit of the currently allowable blue light content from the light source branches, so as to prevent the human eyes from being damaged due to the blue light content.

Step S404 is to adjust the currents for the light source branches in accordance with the determined total current.

In the case that the backlight source includes the blue-light-preventing light source branch, Step S103 may be implemented as follows.

At first, a current distance between the human eye and a screen in front of the backlight source may be determined, e.g., by an infrared or laser sensor.

Then, the total current to be currently applied to the backlight source may be determined in accordance with the current distance between the human eye and the screen in front of the backlight source and the intensity information of the current ambient light. To be specific, when the intensity value of the current ambient light is constant, the smaller the current distance between the human eye and the screen in front of the backlight source, the smaller the total current to be currently applied to the backlight source. When the current distance between the human eye and the screen in front of the backlight source is constant, the larger the intensity value of the current ambient light, the larger the total current to be currently applied to the backlight source. For example, appropriate brightness values corresponding to different intensity thresholds and different distance thresholds may be provided. The intensity information of the current ambient light may be compared with the intensity thresholds, and the current distance between the human eye and the screen may be compared with the distance thresholds, so as to determine the brightness value suitable for the human eye.

Based on an identical inventive concept, the present disclosure further provides in some embodiments a backlight source adjustment device and a display device. The implementations of the light source adjustment device and the display device may refer to the implementation of the above-mentioned method, and thus will not be particularly defined herein.

Figure 5:
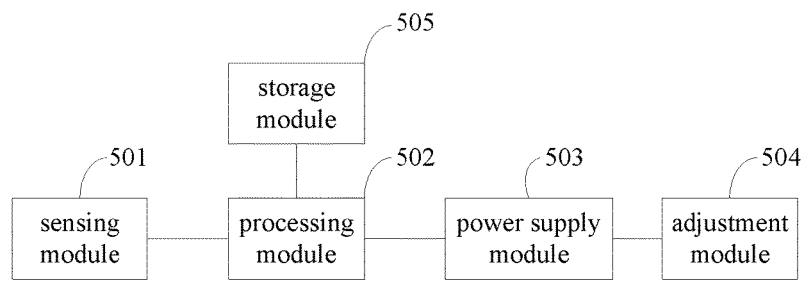
FIG. 5 is a block diagram of a backlight source adjustment device according to one embodiment of the present disclosure.

As shown in FIG. 5, the backlight source adjustment device includes a sensing module 501, a processing module 502, a power supply module 503 and an adjustment module 504.

The sensing module 501 is to acquire intensity information and spectrum information of current ambient light. In one embodiment, the sensing module 501 may include an optical sensor and a spectral sensor.

The processing module 502 is to determine a color temperature corresponding to the current ambient light in accordance with the acquired spectrum information of the current ambient light.

The power supply module 503 is to determine a total current to be currently supplied to a backlight source in accordance with the acquired intensity information of the current ambient light.

The adjustment module 504 is to determine brightness values of light source branches having different color ranges in the backlight source in accordance with the determined color temperature corresponding to the current ambient light and the total current, and adjust currents for the light source branches.

As shown in FIG. 5, the backlight source adjustment device may further include a storage module 505. The storage module 505 is to store therein spectrum information of various types of light sources and color temperatures corresponding to the various types of light sources.

The processing module 502 is further to compare the acquired spectrum information of the current ambient light with the predetermined spectrum information of the various types of light sources, so as to determine a type of a light source in a current environment; and determine the predetermined color temperature corresponding to the type of the light source as the color temperature corresponding to the current ambient light in accordance with the determined type of the light source in the current environment.

The processing module 502 is further to: compare the spectrum information of the current ambient light with a predetermined spectrum of natural light, so as to determine the current environment; in the case that the current environment is determined to be an outdoor environment, determine the natural light as the type of the light source in the current environment; and in the case that the current environment is determined to be an indoor environment, compare the spectrum information of the current ambient light with predetermined spectrum information of various illumination sources, and determine one illumination source with the spectrum information closest to the spectrum information of the current ambient light as the type of the light source in the current environment.

The storage module 505 is further to store therein spectra of the natural light within different time periods.

The processing module 502 is further to: determine a time period to which a current moment displayed by a system clock belongs in accordance with predetermined time periods; determine a spectrum of the natural light corresponding to the time period to which the current moment belongs; and compare the spectrum information of the current ambient light with the spectrum of the natural light corresponding to the time period to which the current moment belongs, so as to determine the current environment.

The storage module 505 is further to store therein color temperatures corresponding to the spectra of the natural light within the time periods.

The processing module 502 is further to, in the case that the determined type of the light source in the current environment is the natural light, determine a predetermined color temperature corresponding to the natural light within the time period to which the current moment belongs as the color temperature corresponding to the current ambient light.

The storage module 505 is further to store therein the spectra and color temperatures of the natural light in the early morning, midday, dusk and night.

The light source branches in the backlight source include a blue-light-preventing light source branch.

The processing module 502 is further to: determine a blue light content to be received by human eyes in the current ambient light in accordance with the acquired intensity information of the current ambient light, the determined color temperature corresponding to the current ambient light and a display duration; and determine an upper limit of a currently allowable blue light content from the light source branches in accordance with the determined blue light content to be received by the human eyes in the current ambient light and a predetermined blue light content threshold capable of being received by the human eyes.

The adjustment module 504 is further to: determine the brightness values of the light source branches in the backlight source in accordance with the upper limit of the currently allowable blue light content from the light source branches and the color temperature corresponding to the current ambient light; and adjust the currents for the light source branches in accordance with the determined total current.

The sensing module 501 is further to determine a current distance between the human eye and a screen in front of the backlight source.

The power supply module 503 is further to determine the total current to be currently applied to the backlight source in accordance with the current distance between the human eye and the screen in front of the backlight source and the intensity information of the current ambient light.

When the intensity value of the current ambient light is constant, the smaller the current distance between the human eye and the screen in front of the backlight source, the smaller the total current to be currently applied to the backlight source. When the current distance between the human eye and the screen in front of the backlight source is constant, the larger the intensity value of the current ambient light, the larger the total current to be currently applied to the backlight source.

The display device in some embodiments of the present disclosure includes a liquid crystal display panel, a backlight source arranged below the liquid crystal display panel, and the above-mentioned backlight source adjustment device. The backlight source may have light source branches with different color ranges. The display device may be any product or member having a display function, such as a mobile phone, a flat-panel computer, a television, a display, a laptop computer, a digital photo frame or a navigator.

Through the above-mentioned description, it may be apparent for a person skilled in the art that the present disclosure may be implemented by hardware, or by software as well as a necessary common hardware platform. Based on this understanding, the technical solutions of the present disclosure may appear in the form of software products, which may be stored in a non-volatile storage medium (Compact Disc Read-Only Memory (CD-ROM), Universal Serial Bus (USB), flash disk or mobile Hard Disk Drive (HDD)) and include several instructions so as to enable a computer equipment (personal computer, server or network equipment) to execute the methods according to the embodiments of the present disclosure.

A person skilled in the art may appreciate that the drawings merely relate to the preferred embodiments, and the modules or flows in the drawings are not always those necessary for the implementation of the present disclosure.

A person skilled in the art may further appreciate that the modules in the device may be arranged in the device as described in the embodiments or, after some changes, in one or more devices different from that according to the embodiment of the present disclosure. The modules may be combined into one module, or may be further divided into a plurality of submodules.

The number of the embodiments is for illustrative purposes only, and none of them is superior to the others.

According to the backlight source adjustment method, the backlight source adjustment device and the display device in the embodiments of the present disclosure, after the acquisition of the intensity information and the spectrum information of the current ambient light, the color temperature corresponding to the current ambient light may be determined in accordance with the spectrum information of the current ambient light, and the total current to be currently applied to the backlight source may be determined in accordance with the intensity information of the current ambient light. Then, the brightness values of light source branches having different color ranges in the backlight source may be determined in accordance with the determined color temperature corresponding to the current ambient light and the total current, and then the currents for the light source branches may be adjusted, so as to adjust the color gamut of the backlight source in accordance with the current ambient light, thereby to adjust the color gamut of the liquid crystal display device and improve the user experience. As compared with the related art where the color gamut of the liquid crystal display device is adjusted by adjusting chromaticity of a color filter, it is able to flexibly adjust the color gamut of the liquid crystal display device and ensure the light transmittance thereof while reducing the production cost of the backlight source.

The above are merely the preferred embodiments of the present disclosure. Obviously, a person skilled in the art may make further modifications and improvements without departing from the spirit of the present disclosure, and these modifications and improvements shall also fall within the scope of the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A backlight source adjustment method, comprising steps of:
   acquiring intensity information and spectrum information of current ambient light;
   determining a color temperature corresponding to the current ambient light in accordance with the acquired spectrum information of the current ambient light;
   determining a total current to be currently supplied to a backlight source in accordance with the acquired intensity information of the current ambient light; and
   determining brightness values of light source branches having different color ranges in the backlight source in accordance with the determined color temperature corresponding to the current ambient light and the total current, and adjusting currents for the light source branches,
   wherein the step of determining the color temperature corresponding to the current ambient light in accordance with the acquired spectrum information of the current ambient light comprises:
   determining a type of a light source in a current environment by comparing the acquired spectrum information of the current ambient light with predetermined spectrum information of various types of light sources; and
   determining a predetermined color temperature corresponding to the type of the light source in the current environment as the color temperature corresponding to the current ambient light in accordance with the determined type of the light source in the current environment,
   wherein the step of determining the type of the light source in the current environment by comparing the acquired spectrum information of the current ambient light with predetermined spectrum information of various types of light sources comprises:
   determining the current environment by comparing the spectrum information of the current ambient light with a predetermined spectrum of natural light;
   determining the natural light as the type of the light source in the current environment when determining that the current environment is an outdoor environment; and
   when determining that the current environment is an indoor environment, comparing the spectrum information of the current ambient light with predetermined spectrum information of various illumination sources, and determining one illumination source with the spectrum information closest to the spectrum information of the current ambient light as the type of the light source in the current environment.

2. The backlight source adjustment method according to claim 1, wherein the predetermined spectrum of the natural light comprises spectra of the natural light within different time periods, and the step of determining the current environment by comparing the spectrum information of the current ambient light with the predetermined spectrum of natural light comprises:
   determining a time period to which a current moment displayed by a system clock belongs in accordance with predetermined time periods;
   determining a spectrum of the natural light corresponding to the time period to which the current moment belongs; and
   determining the current environment by comparing the spectrum information of the current ambient light with the spectrum of the natural light corresponding to the time period to which the current moment belongs.

3. The backlight source adjustment method according to claim 2, wherein the step of determining the predetermined color temperature corresponding to the type of the light source in the current environment as the color temperature corresponding to the current ambient light in accordance with the determined type of the light source in the current environment comprises:
   when determining that the type of the light source in the current environment is the natural light, determining a predetermined color temperature corresponding to the natural light within the time period to which the current moment belongs as the color temperature corresponding to the current ambient light.

4. The backlight source adjustment method according to claim 2, wherein the predetermined time periods comprise early morning, midday, dusk and night.

5. The backlight source adjustment method according to claim 1, wherein the light source branches in the backlight source comprise a blue-light-preventing light source branch.

6. The backlight source adjustment method according to claim 5, wherein subsequent to the step of determining the color temperature corresponding to the current ambient light in accordance with the acquired spectrum information of the current ambient light, the backlight source adjustment method further comprises:
   determining a blue light content to be received by human eyes in the current ambient light in accordance with the acquired intensity information of the current ambient light, the determined color temperature corresponding to the current ambient light and a display duration; and
   determining an upper limit of a currently allowable blue light content from the light source branches in accordance with the determined blue light content to be received by the human eyes in the current ambient light and a predetermined blue light content threshold capable of being received by the human eyes; and
   the step of determining the brightness values of the light source branches having different color ranges in the backlight source in accordance with the determined color temperature corresponding to the current ambient light and the total current and adjusting the currents for the light source branches comprises:
   determining the brightness values of the light source branches in the backlight source in accordance with the upper limit of the currently allowable blue light content from the light source branches and the color temperature corresponding to the current ambient light; and
   adjusting the currents for the light source branches in accordance with the determined total current.

7. The backlight source adjustment method according to claim 5, wherein the step of determining the total current to be currently supplied to the backlight source in accordance with the acquired intensity information of the current ambient light comprises:
determining a current distance between the human eye and a screen in front of the backlight source; and
determining the total current to be currently applied to the backlight source in accordance with the current distance between the human eye and the screen in front of the backlight source and the intensity information of the current ambient light.

8. The backlight source adjustment method according to claim 7, wherein in the step of determining the total current to be currently applied to the backlight source in accordance with the current distance between the human eye and the screen in front of the backlight source and the intensity information of the current ambient light,
when an intensity value of the current ambient light is constant, the smaller the current distance between the human eye and the screen in front of the backlight source, the smaller the total current to be currently applied to the backlight source; and when the current distance between the human eye and the screen in front of the backlight source is constant, the larger the intensity value of the current ambient light, the larger the total current to be currently applied to the backlight source.

9. A backlight source adjustment device, comprising:
a sensing module configured to acquire intensity information and spectrum information of current ambient light;
a processing module configured to determine a color temperature corresponding to the current ambient light in accordance with the acquired spectrum information of the current ambient light;
a power supply module configured to determine a total current to be currently supplied to a backlight source in accordance with the acquired intensity information of the current ambient light;
an adjustment module configured to determine brightness values of light source branches having different color ranges in the backlight source in accordance with the determined color temperature corresponding to the current ambient light and the total current, and adjust currents for the light source branches; and
a storage module configured to store therein spectrum information of various types of light sources and color temperatures corresponding to the various types of light sources,
wherein the processing module is further configured to determine a type of a light source in a current environment by comparing the acquired spectrum information of the current ambient light with the predetermined spectrum information of the various types of light sources; and determine the predetermined color temperature corresponding to the type of the light source as the color temperature corresponding to the current ambient light in accordance with the determined type of the light source in the current environment,
wherein the processing module is further configured to:
determine the current environment by comparing the spectrum information of the current ambient light with a predetermined spectrum of natural light;
determine the natural light as the type of the light source in the current environment when determining that the current environment is an outdoor environment; and
when determining that the current environment is an indoor environment, compare the spectrum information of the current ambient light with predetermined spectrum information of various illumination sources, and determine one illumination source with the spectrum information closest to the spectrum information of the current ambient light as the type of the light source in the current environment.

10. The backlight source adjustment device according to claim 9, wherein the storage module is further configured to store therein spectra of the natural light within different time periods, and
the processing module is further configured to: determine a time period to which a current moment displayed by a system clock belongs in accordance with predetermined time periods; determine a spectrum of the natural light corresponding to the time period to which the current moment belongs; and determine the current environment by comparing the spectrum information of the current ambient light with the spectrum of the natural light corresponding to the time period to which the current moment belongs.

11. The backlight source adjustment device according to claim 10, wherein the storage module is further configured to store therein color temperatures corresponding to the spectra of the natural light within the time periods, and
the processing module is further configured to, when determining that the type of the light source in the current environment is the natural light, determine a predetermined color temperature corresponding to the natural light within the time period to which the current moment belongs as the color temperature corresponding to the current ambient light.

12. The backlight source adjustment device according to claim 10, wherein the storage module is further configured to store therein the spectra and color temperatures of the natural light in the early morning, midday, dusk and night.

13. The backlight source adjustment device according to claim 9, wherein the light source branches in the backlight source comprise a blue-light-preventing light source branch,
the processing module is further configured to: determine a blue light content to be received by human eyes in the current ambient light in accordance with the acquired intensity information of the current ambient light, the determined color temperature corresponding to the current ambient light and a display duration; and determine an upper limit of a currently allowable blue light content from the light source branches in accordance with the determined blue light content to be received by the human eyes in the current ambient light and a predetermined blue light content threshold capable of being received by the human eyes, and
the adjustment module is further configured to: determine the brightness values of the light source branches in the backlight source in accordance with the upper limit of the currently allowable blue light content from the light source branches and the color temperature corresponding to the current ambient light; and adjust the currents for the light source branches in accordance with the determined total current.

14. The backlight source adjustment device according to claim 13, wherein the sensing module is further configured to determine a current distance between the human eye and a screen in front of the backlight source; and the power supply module is further configured to determine the total current to be currently applied to the backlight source in accordance with the current distance between the human eye and the screen in front of the backlight source and the intensity information of the current ambient light.

15. The backlight source adjustment device according to claim 14, wherein the power supply module is further configured to, when an intensity value of the current ambient light is constant, supply the total current to the backlight source in such a manner that the smaller the current distance between the human eye and the screen in front of the backlight source, the smaller the total current to be currently applied to the backlight source;
the power supply module is further configured to, when the current distance between the human eye and the screen in front of the backlight source is constant, supply the total current to the backlight source in such a manner that the larger the intensity value of the current ambient light, the larger the total current to be currently applied to the backlight source.

16. A display device, comprising:
a liquid crystal display panel;
a backlight source for the liquid crystal display panel; and
the backlight source adjustment device according to claim 9;
wherein the backlight source comprises light source branches with different color ranges.

17. A backlight source adjustment device, comprising:
a sensing module configured to acquire intensity information and spectrum information of current ambient light;
a processing module configured to determine a color temperature corresponding to the current ambient light in accordance with the acquired spectrum information of the current ambient light;
a power supply module configured to determine a total current to be currently supplied to a backlight source in accordance with the acquired intensity information of the current ambient light;
an adjustment module configured to determine brightness values of light source branches having different color ranges in the backlight source in accordance with the determined color temperature corresponding to the current ambient light and the total current, and adjust currents for the light source branches; and
wherein the light source branches in the backlight source comprise a blue-light-preventing light source branch,
the processing module is further configured to: determine a blue light content to be received by human eyes in the current ambient light in accordance with the acquired intensity information of the current ambient light, the determined color temperature corresponding to the current ambient light and a display duration; and determine an upper limit of a currently allowable blue light content from the light source branches in accordance with the determined blue light content to be received by the human eyes in the current ambient light and a predetermined blue light content threshold capable of being received by the human eyes, and
the adjustment module is further configured to: determine the brightness values of the light source branches in the backlight source in accordance with the upper limit of the currently allowable blue light content from the light source branches and the color temperature corresponding to the current ambient light; and adjust the currents for the light source branches in accordance with the determined total current.

18. The backlight source adjustment device according to claim 17, further comprising a storage module configured to store therein spectrum information of various types of light sources and color temperatures corresponding to the various types of light sources,
wherein the processing module is further configured to determine a type of a light source in a current environment by comparing the acquired spectrum information of the current ambient light with the predetermined spectrum information of the various types of light sources; and determine the predetermined color temperature corresponding to the type of the light source as the color temperature corresponding to the current ambient light in accordance with the determined type of the light source in the current environment.

19. The backlight source adjustment device according to claim 17, wherein the storage module is further configured to store therein spectra of the natural light within different time periods, and
the processing module is further configured to: determine a time period to which a current moment displayed by a system clock belongs in accordance with predetermined time periods; determine a spectrum of the natural light corresponding to the time period to which the current moment belongs; and determine the current environment by comparing the spectrum information of the current ambient light with the spectrum of the natural light corresponding to the time period to which the current moment belongs.

20. The backlight source adjustment device according to claim 19, wherein the storage module is further configured to store therein color temperatures corresponding to the spectra of the natural light within the time periods, and
the processing module is further configured to, when determining that the type of the light source in the current environment is the natural light, determine a predetermined color temperature corresponding to the natural light within the time period to which the current moment belongs as the color temperature corresponding to the current ambient light.

* * * * *